United States Patent
Herdegen et al.

(10) Patent No.: US 7,028,566 B2
(45) Date of Patent: Apr. 18, 2006

(54) METROLOGICAL RECORDING OF BEARING PLAYS IN A HIGHLY DYNAMIC MECHANICAL TRANSMISSION CHAIN

(75) Inventors: Gunter Herdegen, Diessen (DE); Mathias Pflugbeil, Baldham (DE); Wilheim Senner, Hitzhofen (DE); Edwin Thum, Heimstetten (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/484,841

(22) PCT Filed: Jul. 6, 2002

(86) PCT No.: PCT/EP02/07573

§ 371 (c)(1),
(2), (4) Date: Aug. 2, 2004

(87) PCT Pub. No.: WO03/010490

PCT Pub. Date: Feb. 6, 2003

(65) Prior Publication Data

US 2005/0066754 A1  Mar. 31, 2005

(30) Foreign Application Priority Data

Jul. 26, 2001  (DE)  ................................ 101 36 629

(51) Int. Cl.
*G01N 19/00* (2006.01)

(52) U.S. Cl. ...................................................... 73/865.9

(58) Field of Classification Search ................ 73/865.9
See application file for complete search history.

(56) References Cited

U.S. PATENT DOCUMENTS 2,856,770 A  10/1958  Palsson ........................ 73/162
4,967,154 A  10/1990  Marantette ............. 324/207.12

FOREIGN PATENT DOCUMENTS

| DE | 19915731 A1 | 11/2000 |
|---|---|---|
| EP | 1014064 A2 | 6/2000 |
| JP | 01-187106 | 7/1989 |
| JP | 09-086401 | 3/1997 |

*Primary Examiner*—Hezron Williams
*Assistant Examiner*—Tamiko Bellamy
(74) *Attorney, Agent, or Firm*—Crowell & Moring LLP

(57) ABSTRACT

Method for measuring the bearing play in a highly dynamic mechanical transmission chain between a setting member and a functional member on which it acts, wherein a control unit actuates the setting member with a square-shaped desired signal of at least half a period and a measuring device is provided with a sensor for sensing the position of the functional element measures its distance from a reference point of the functional element, and the bearing play is determined from the comparison of the actual deflection with the command signal of the setting member.

14 Claims, 2 Drawing Sheets

METROLOGICAL RECORDING OF BEARING PLAYS IN A HIGHLY DYNAMIC MECHANICAL TRANSMISSION CHAIN

This application claims the priority of German patent document 10136 629.9, filed Jul. 26, 2001 (PCT International Patent Application No. PCT/EP02/07573, filed Jul. 6, 2002), the disclosure of which is expressly incorporated by reference herein.

BACKGROUND AND SUMMARY OF THE INVENTION

The invention relates to a method for measuring the bearing play in a highly dynamic mechanical transmission chain with a setting member, which acts on a functional element and the interaction of which generates the bearing play to be measured.

In high frequency mechanical transmission chains, the setting members are moved in high frequency in particular to carry out an adjustment. Thus, the resulting bearing play of the transmission elements can increase very rapidly. When the resulting bearing play exceeds a specific size, the case occurs that a commanding transmission chain is moved with a phase delay in a specific direction of the setting member attached thereto. In so doing, the phase delay can amount to −180 degrees, whereby the control or damping effect that is intended by the setting member is not achieved, but rather an opposite effect. In particular, however, there is the danger that before such a phase delay can occur, the structural parts of the mechanical transmission chain have broken down due to the massive follow-up movements.

One example, to which the method of the invention can be applied, is the checking of the bearing play in controlled aircrafts, where the bearing play has to be observed and checked at regular intervals. In addition to the frequency of the required checking due to the continuous loads, the high frequency of the required bearing play measurements is also caused by the fact that such a measurement has to be taken for every change in the system lifting surface/control surface. However, the invention does not relate only to the checking of the bearing play in controlled aircrafts. The invention can be applied just as well to the checking of the bearing play in any type of flying devices as well as in general to highly dynamic mechanical transmission chains.

Another device or another method from the construction of aircrafts for measuring the bearing play of control surfaces is known from the DE 199 43 481 A1. In this case the actuator is moved into an arrested position by generating a predefined hydraulic pressure, by activating the electricity and by setting a predefined operating state of the automatic pilot. Furthermore, the control surface to be checked is loaded first in a first direction of movement by means of a weight; and in this load state the deflection is measured with a dial gauge. Then in a second step the control surface is loaded in the opposite direction. Then one can conclude the bearing play from the information of the dial gauge.

One drawback of this method is that to generate a weight in the opposite directions large gallows must be set up at least for one direction so that the complexity of the devices is not insignificant. Another drawback is that the process of ascending and removal of relatively large weights per measurement must be performed twice and repeated for all control surfaces. In so doing, first of all, the labor cost and secondly the storage cost of the weights and the measurement setups is very high. Since, furthermore, weights of up to 300 kg must be raised in partial weights of 20 kg, the carrying of the weights for the engineer taking the measurements is dangerous. In addition, the process is subject on the whole to risks, since it can never be totally ruled out that one of the control surfaces will not start to move as a consequence of the control movements of the dynamics and thus overthrow the measurement setup with the weights. Another drawback of the method according to the prior art is that each measured value of the dial gauge has to be read and entered manually on a log sheet, since for every work step the indicating dial gauge has to be recorded as a function of the weights to be raised manually. Irrespective of the onerous task of writing down, this method is subject to a high risk of errors. Similarly the manual input of the measured values into a computer constitutes a source of error that cannot be ignored.

Therefore, the object of the invention is to provide a device and a method for measuring the bearing play of a highly dynamic mechanical transmission chain, which is simple to set up, safe to use and guarantees a high degree of accuracy.

This problem is solved by providing a measuring device with a sensor for sensing the position of a functional element, whereby the sensor measures its distance from a reference point of the functional element, and a control unit which actuates the setting member by means of a square-shaped desired signal of half a period, wherein the bearing play is determined from the comparison of the actual deflection with the command signal of the setting member.

Other objects, advantages and novel features of the present invention will become apparent from the following detailed description of the invention when considered in conjunction with the accompanying drawings.

DETAILED DESCRIPTION OF THE DRAWINGS

Figure 1:
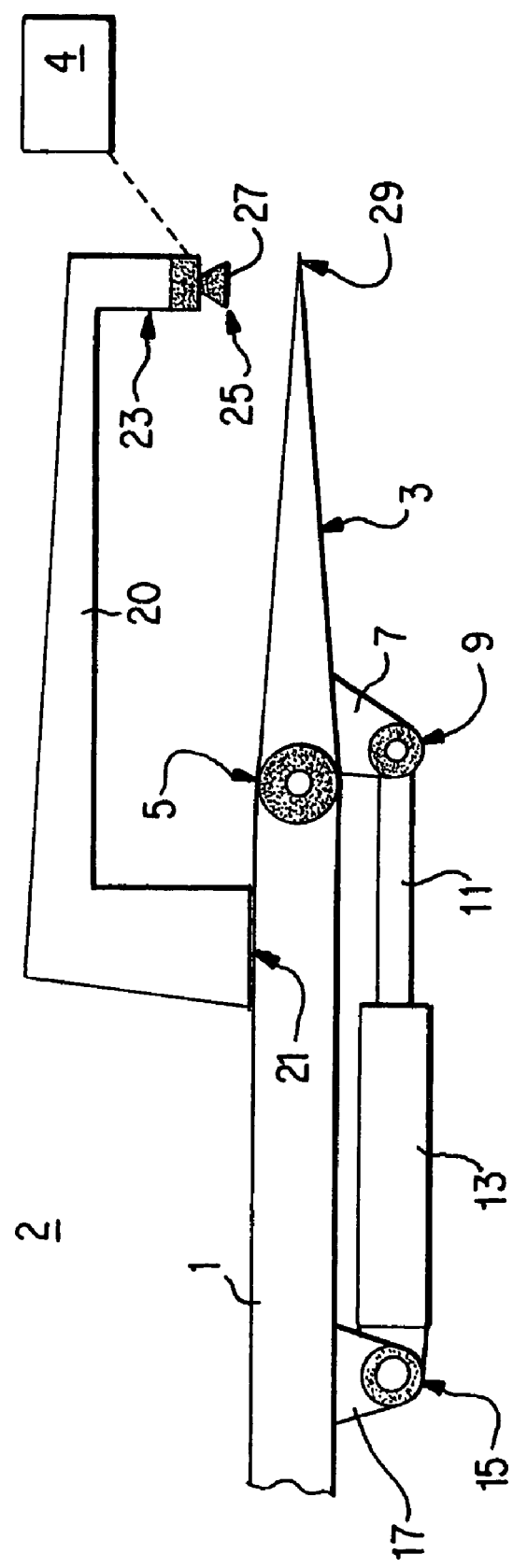
FIG. 1 depicts schematically, as an example of a highly dynamic mechanical transmission chain, a wing with a control surface, with the setting cylinder, moving said wing, as well as an example of the measuring device of the invention.

The illustrated wing 2 includes a transmission element or movement means 3, which in the described embodiment is a control surface, which is disposed moveably on the lifting surface 1 by means of a bearing 5. To move the control surface 3, a joystick or a force introducing fitting 7 with a bearing 9 is attached to said control surface. A piston rod 11 of an adjustment cylinder 13 engages with the bearing 9. The adjustment cylinder in turn is connected to the wing 2 by means of the bearing 15 and a forcing introducing fitting 17. This arrangement comprising wing 2, control surface 3 and adjustment cylinder 13 applies in particular to controlled aircrafts, which command a plurality of fast control surface movements on the basis of the internal actutor control circuit with a regulator, whereby the bearing play can become worse in a relatively short period of time.

In the drawing of the subject matter of FIG. 1, the adjustment cylinder 13 has the function of a setting member and the control surface 3 has the function of a transmission element.

To measure the bearing play according to the invention, there are fastening means for fastening a measuring device 25 with respect to the functional or transmission element or the movement means 3 or movement means that are mounted on the bearing 5. Said fastening means guarantee a defined positioning of the measuring device with respect to the movement means. To this end, for example, in the described embodiment a support arm 20 is fastened to the point 21 of the lifting surface on the lifting surface 1 of an airplane. The attachment point 21 on the lifting surface 1 has to be clearly defined in order to make the measurements, carried out according to the invention, reproducible. In addition, the attachment point 21 must guarantee a stable attachment of the support arm 20, since a measuring device 25 with a sensor 27 is arranged on the free end 23 of the support arm 20, whereby the sensor 27 measures its distance from the free end 29 of the transmission element or the control surface 3 or at a suitable point in its vicinity. In the following the description relates to the measurement of the distance between the sensor and the free end 29. However, the method of the invention can be easily applied to other points on the control surface 3.

The sensor 27 measures the distance to the position of the free end 29 of the control surface 3, which depends on the commanded position of the control surface 3, plus the bearing play. The sensor 27 is designed preferably as a laser sensor according to the state of the art that emits laser light and receives the laser light reflected at the free end 29 and from that finds the distance to the free end 29. The measurement data is collected and evaluated in a control unit that can be arranged at the sensor or at a distance from the measuring device.

In the example of a lifting surface 1, the control surface 3, and the adjustment cylinder 13 that are shown in FIG. 1, the bearing play of the bearings 5, 9, 15 must be checked. In general those bearings that have an impact on the position or setting of the transmission element or movement means 3 must be checked. To this end, the adjustment cylinder 13, thus the setting member, is commanded, according to the invention, with a square-shaped command signal of at least half a period in one direction.

Figure 2:
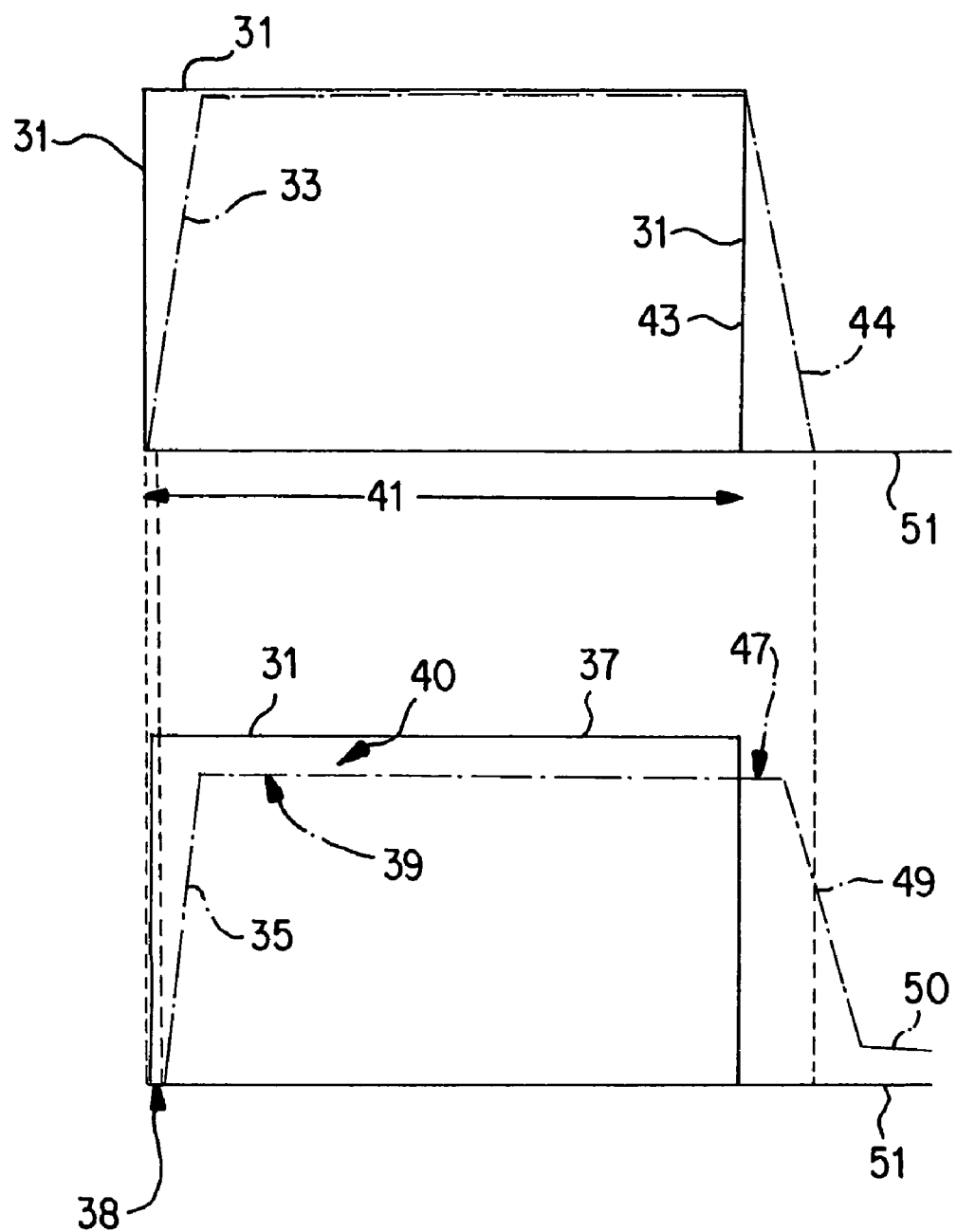
FIG. 2 is a top view of an exemplary flow of the inventive command signal of the control unit to the setting member and a bottom view of the flow of the response signal resulting from the movement of a predefined reference point on the control surface.

This command signal is labeled with the reference numeral 31 in the top drawing of FIG. 2. Owing to the inertia of the transmission members and other effects, such as the elasticity of the hydraulic circuit in the example of FIG. 1, the adjustment cylinder 13 runs, on the basis of the command signal 31, an essentially ramp-shaped response signal 33, which can be sensed there by means of position transducers or other sensors. In the bottom drawing of FIG. 2 the movement of a predetermined point on the free end 29 of the control surface 3, thus a reference point on the functional element, is labeled with the reference numeral 35 on the basis of the response signal 33 of the setting member 13. The command signal 31 is defined in such a manner that the control surface 3 or its free end 29 is supposed to receive a specified deflection 37 on the basis of a corresponding command to the setting member 13. This controlled position 37 is a reference variable, in relation to which the actual deflection of the free end 29, which is illustrated with the use of the curve or line 35, is put.

As evident from the bottom drawing of FIG. 2, in the presence of a bearing play the actual deflection moves with a delay 38 up until a maximum deflection 39 of the free end 29 of the control surface 3, which is located one difference 40 below the desired position 37. This difference 40 is the result, on the one hand, of the bearing play of the bearings 5, 9, 15 to be checked. However, other bearings and/or elasticity of the setting elements can also enter into the difference 40. These side effects are tolerated, according to the invention, because they are assumed to be relatively small compared to the bearing play to be checked. In the inventive method, the side effects are either known in advance or can be determined by pilot tests. The side effects can be calculated either from the difference 40 or, in the case that they can be ignored, included in the calculation. The difference 40 can be derived directly from the measurement with the measuring device 25 with the sensor 25.

The actual movement 35 of the free end 29 stays approximately in the position of the maximum deflection 39 due to the friction and damping effects. Any decrease in the deflection from the maximum deflection 39 enters into the said side effects. After a predefined timespan 41 after starting up the command signal 31, the command signal is run, according to the invention, to the starting value or the reference value, as shown with line 43 in FIG. 2. Owing to the inertia and elasticity effects in the transmission chain, the result in turn is essentially a ramp line 44 in the response signal 33 that drops to the starting value or the reference value.

The ramp-shaped drop 44 in the response signal 33 yields with a delay 47 also a ramp-shaped drop 49 in the actual deflection 35 of the free end 29. The delay 47 occurs because due to the maximum deflection 39 all of the bearings of the transmission chain to be checked are moved into a first end position, which is equivalent to the direction of transmission opposite the end position. The decreasing ramp 49 of the response signal 35 runs only to a value 50 above the neutral line 51, or back to the value 51, to which the command signal 31 has been run back.

The bearing play is found, according to the invention, by comparing the actual deflection 35 with the command signal 31 or the response signal 33 of the adjustment cylinder. In so doing, the delay 47, the maximum deflection 39 as well as the end value 50 of the response signal of the setting surface or the free end 29 form the basis.

As an alternative, instead of the free end 29 of a setting member, any arbitrary other suitable reference point can be used to find the bearing play by means of the actual movement of such a reference point in comparison with a command signal. The size of the commanded deflection 39 depends on the application case. It does not have to go to a maximum value with respect to the respective setting member, but rather can also be aimed at a relatively low amount.

Preferably the command signal is only half a period. As an alternative, however, depending on the application case, this process can be continued. For example, the command signal can run through a complete period or several periods.

The transmission member or the movement means 3, which is the control surface 3 in the embodiment of FIG. 1, is commanded, according to the invention, by means of a setting member, which is the adjustment cylinder 13 in FIG. 1. The response signal 33 of the setting member (FIG. 2) is found, according to the invention, by means of a corresponding position transducer at or in the setting member. The setting member is commanded by means of a corresponding control unit, which generates the command signals 31 and transmits to the setting member. Furthermore, the control unit takes the measurement signals, generated by the measuring device 25, and carries out the illustrated comparison to determine the bearing play.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method for measuring the bearing play in a highly dynamic mechanical transmission chain comprising a setting member which acts on a functional element and the interaction of which generates the bearing play to be measured, comprising a control unit to actuate the setting member and an evaluator to gather the measured values, wherein
    a measuring device is provided with a sensor for sensing the position of the functional element, whereby the sensor measures its distance from a reference point of the functional element,
    the control unit actuates the setting member by means of a square-shaped desired signal of half a period and the bearing play is determined from the comparison of the actual deflection with the command signal of the setting member.

2. Method for measuring the bearing play in a highly dynamic mechanical transmission chain, as claimed in claim 1, wherein a delay, a maximum deflection or a end value of the response signal form the basis in the comparison of the actual deflection with the command signal.

3. Method for measuring the bearing play in a highly dynamic mechanical transmission chain, as claimed claim 1, wherein the method is applied to the measurement of the bearing play of a control surface of a lifting surface of an airplane as the functional element, and that to setup the measuring device with respect to the control surface, a support arm is fastened to the lifting surface.

4. Method for measuring the bearing play in a highly dynamic mechanical transmission chain, as claimed claim 2, wherein the method is applied to the measurement of the bearing play of a control surface of a lifting surface of an airplane as the functional element, and that to setup the measuring device with respect to the control surface, a support arm is fastened to the lifting surface.

5. A method for measuring a bearing play in a highly dynamic mechanical transmission chain having a setting member which acts on a functional element, comprising the steps of:
    actuating the setting member, wherein a control unit commands actuation of the setting member in accordance with a predetermined signal to cause a commanded deflection of the functional element;
    measuring a deflection of the functional element during the actuation of the setting member, wherein a measuring device provided with a sensor senses a distance between the sensor and a reference point of the functional element; and
    determining the bearing play between the setting member and the functional element from a comparison of the measured deflection with the commanded deflection.

6. The method of claim 5, wherein the predetermined signal is a square-shaped signal of half a period.

7. The method of claim 6, wherein in the determining step, one of a delay, a maximum deflection or an end value of the measured deflection is compared with the commanded deflection.

8. The method of claim 6, wherein the functional element is a control surface of a lifting surface of an airplane, and a support arm supporting the measuring device is affixed to the lifting surface.

9. The method of claim 7, wherein the functional element is a control surface of a lifting surface of an airplane, and a support arm supporting the measuring device is affixed to the lifting surface.

10. An apparatus for measuring a bearing play in a highly dynamic mechanical transmission chain having a setting member which acts on a functional element, comprising:
    a control unit, wherein the control unit commands actuation of the setting member with a predetermined signal to cause a commanded deflection of the functional element;
    a measuring device provided with a sensor which senses a distance between the sensor and a reference point of the functional element, wherein the measuring device measures a deflection of the functional element during actuation of the setting member; and
    an evaluator which determines the bearing play between the setting member and the functional element from a comparison of the measured deflection with the commanded deflection.

11. The apparatus of claim 10, wherein the predetermined signal is a square-shaped signal of half a period.

12. The apparatus of claim 11, wherein the evaluator determines the bearing play by comparing one of a delay, a maximum deflection or an end value of the measured deflection with the commanded deflection.

13. The apparatus of claim 11, wherein the functional element is a control surface of a lifting surface of an airplane, further comprising:
    a support arm supporting the measuring device affixed to the lifting surface.

14. The apparatus of claim 12, wherein the functional element is a control surface of a lifting surface of an airplane, further comprising:
    a support arm supporting the measuring device affixed to the lifting surface.

* * * * *